A. F. SHULER.
INCUBATOR.
APPLICATION FILED JAN. 2, 1914.
1,126,105.
Patented Jan. 26, 1915.
2 SHEETS—SHEET 1.
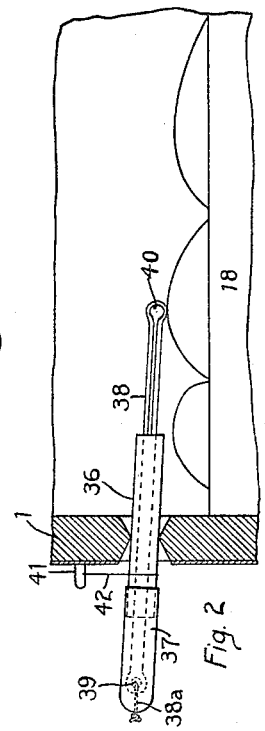
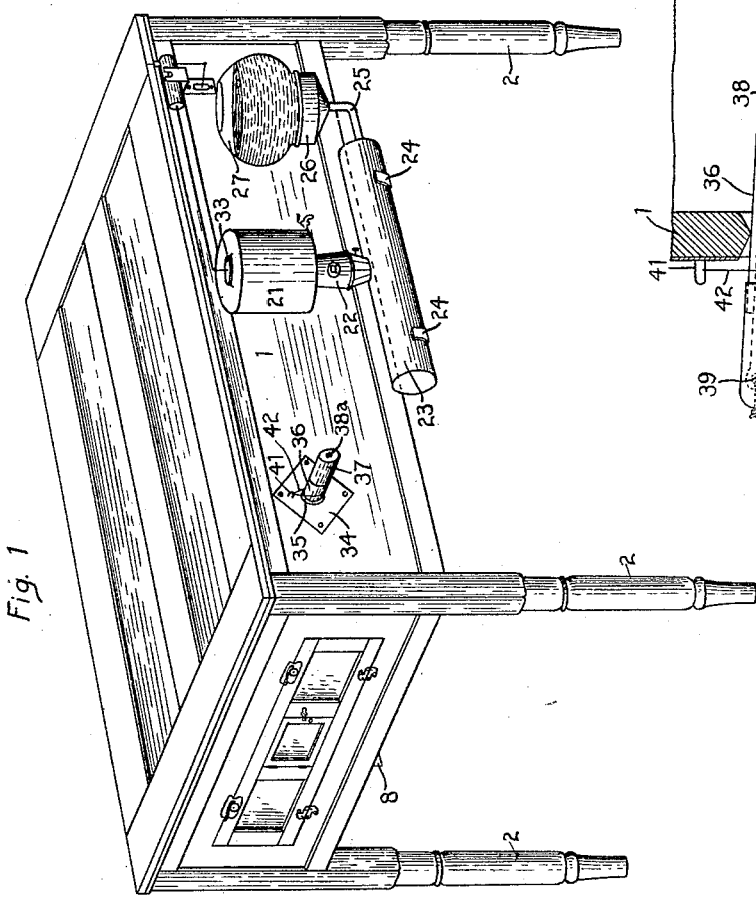
Witnesses
C. S. Paull
J. Milton Rice
Inventor
Andrew F. Shuler
By Howard S. Smith
    Yes   Attorney A. F. SHULER.
INCUBATOR.
APPLICATION FILED JAN. 2, 1914.
1,126,105.
Patented Jan. 26, 1915.
2 SHEETS—SHEET 2.
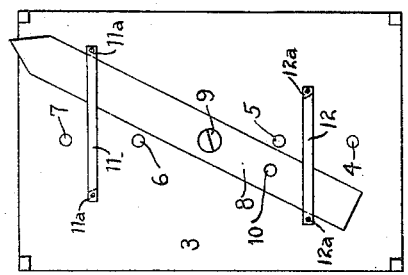
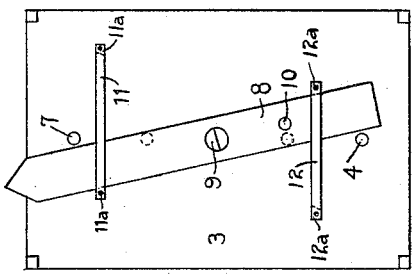
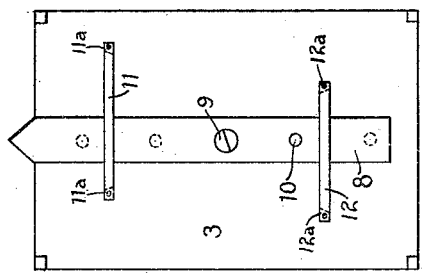
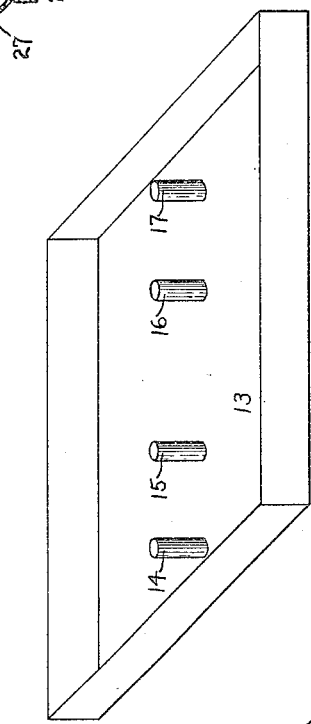

UNITED STATES PATENT OFFICE.

ANDREW F. SHULER, OF ARCANUM, OHIO.

INCUBATOR.

1,126,105.  Specification of Letters Patent.  Patented Jan. 26, 1915.

Application filed January 2, 1914. Serial No. 809,804.

*To all whom it may concern:*

Be it known that I, ANDREW F. SHULER, a citizen of the United States, residing at Arcanum, in the county of Darke and State of Ohio, have invented new and useful Improvements in Incubators, of which the following is a specification.

This invention relates to new and useful improvements in incubators.

The principal object of my invention is to provide means for freely distributing or diffusing the air throughout an incubator at all times.

With the above object in view I have provided my improved incubator, one embodiment of which is illustrated in the accompanying drawings of which—

Figure 1 is a perspective view of the incubator. Fig. 2 is a sectional view showing my improved incubator thermometer in position. Fig. 3 is a bottom plan view showing the first position of the ventilating lever. Fig. 4 is a bottom plan view showing the second position of said lever. Fig. 5 is a bottom plan view showing the third position of said lever. Fig. 6 is a perspective view of the nursery tray containing the ventilating tubes. Fig. 7 is a sectional view of the lower end of the inverted reservoir and valve therefor. Fig. 8 is a front sectional view taken through the incubator, showing the egg tray in position upon the nursery tray, and Fig. 9 is a vertical section taken on the line *a—a* of Fig. 8.

Throughout the specification and drawings, similar reference characters denote corresponding parts.

In a detailed description of my invention, 1 designates an incubator casing mounted upon suitable legs 2 and provided with a bottom 3 which is constructed as follows: Preferably arranged in horizontal alinement in the middle portion of said incubator bottom, are apertures or openings 4, 5, 6 and 7 to give the eggs the proper ventilation during the three weeks of incubation. That this may be accomplished more effectively, a lever 8 is provided, which is secured to the incubator bottom 3 by a pivot 9. The normal position of said lever is immediately over the openings 4, 6 and 7, and when in such position an aperture 10 in said lever will register with the aperture 5 in the incubator bottom. However, all the other apertures will be closed by the lever when the latter occupies the position just mentioned. (See Fig. 3.) Therefore, air will be admitted to the incubator through but one opening, which will be sufficient for the first week of incubation. As life develops within the egg, more air is required in order that a healthy chick may be hatched. This additional air must be supplied during the second week of incubation, and therefore the lever is moved from its straight position to the extreme left. In order to guide the lever in its movement, guiding members 11 and 12 are provided. The member 11 is supported by posts or blocks 11ª, which also serve to limit the movement, in either direction, of the upper portion of the lever 8, while the member 12 is supported by posts or blocks 12ª which also serve to limit the movement of the lower portion of said lever in either direction. When moved to the extreme left or the position shown in Fig. 4, the lever 8 will uncover two apertures, namely, 4 and 7, through which sufficient air will be admitted to the incubator for the second week of incubation. As a still larger quantity of air must be admitted for the third week of incubation, the lever is pushed to the extreme right, whereupon the apertures 4, 5, 6 and 7 will be uncovered, and through all four of these openings sufficient air will be admitted for the third week of incubation. (See Fig. 5.) As the lever extends a short distance beyond the bottom of the incubator, it is readily accessible to the hand, and on being set to the three positions described, the correct amount of air required for each period of incubation may be supplied. And it is largely due to this progressive admission of air in correct proportions, that good healthy chicks will be hatched.

Provided within the incubator is a nursery tray 13 into which the newly hatched chicks fall after they leave the eggs. It has been found by common experience that where the ventilating apertures extend no further than through the bottom of the nursery tray, the newly hatched chicks will clog them up, thus obstructing the flow of the required amount of air for ventilation. As an effective remedy for this defect, I provide a series of upwardly projecting ventilating tubes 14, 15, 16 and 17, which are mounted in the bottom of the incubator and communicate with the apertures 4, 5, 6 and 7 therein. (See Fig. 6.) Positioned immediately above the nursery tray 13, within the incubator, is an egg tray 18 having an apertured bottom 19 and a central supporting slat or member 20. (See Fig. 8.) The ventilating tubes 14, 15, 16 and 17 are in horizontal alinement with this slat 20 when the nursery tray is in proper position within the incubator. Accordingly, the air passing through these tubes will strike said slat and be thereby diffused or distributed uniformly throughout the incubator. It will also be seen that the ventilating tubes are of such height as to make it impossible for them to be clogged up by the newly hatched chicks, even when the nursery tray is full of them, thus offering a free and unobstructed passage to the air which they receive for ventilation.

It is quite important that incubators be economically and accurately heated, and for accomplishing this purpose I have provided the following improved construction: Suitably secured to the casing 1 is a vessel or drum 21 within which water is heated for circulation throughout the incubator by means not shown. For the purpose of heating said vessel a lamp 22 is provided, which is supported by and communicates with a longitudinal tank 23 supported by arms 24 secured to the incubator casing 1. This tank is adapted to supply the liquid fuel, preferably oil, to the lamp 22. Communicating with the tank 23 through a tube 25 is a liquid fuel pan or holder 26 adapted to receive an inverted reservoir 27. This reservoir may be constructed of metal or glass, but is preferably constructed of the latter in order that the level of the oil which it contains may be at all times exposed to view. The reservoir 27 has a neck portion 28 adapted to house a valve 29 which has a projecting stem 30. A spring 31 suitably secured within the neck portion 28 normally holds the valve 29 on its seat 32, whereby, when the reservoir is inverted, no oil will escape therefrom. (See Fig. 7.) However, when the reservoir 27 is inverted and placed in position within the holder 26, the stem of the valve 29 will contact with the bottom of said holder whereby said valve will be lifted from its seat 32. And as the reservoir 27 is positioned above the tank 23, gravity will insure a constant flow of oil from said reservoir, past the valve 29, into the tank 23. Therefore, since a constant flow of oil is automatically insured to said tank, the lamp will burn with sufficient uniformity to accurately and economically heat the vessel 21. Fitted in the top of the vessel 21 is a thermostatically controlled air-inlet valve 33 to automatically regulate the temperature of said vessel. Since this valve, together with its actuating means, forms no part of my invention, and is well known in the art, no further description of the same is deemed necessary.

In incubators as at present constructed, it is difficult to ascertain the temperature of the eggs after the 18th day. This is due to the fact that it is not proper to open the door of the incubator after that time, for fear of exposing the eggs to too much air. Then again, the incubator thermometer, when resting wholly upon the eggs, is so disarranged by the chicks after the hatching period begins, as to be partially or totally concealed from view.

My invention embodies the following construction which renders the thermometer accessible at all times. Suitably secured to one side of the casing 1 is a metallic plate 34 containing an opening 35 which extends through said casing. This opening freely receives a metallic tube 36 which has a pivotal movement therein, part of said tube being on the inside and part on the outside of the incubator casing. The tube 36 is adapted to receive on its outer end a metallic cap 37. 38 designates an incubator thermometer, the eye end of which is firmly secured within the cap 37 by a cord $38^a$, which, after being passed through the eye 39, is drawn through an aperture in the outer end of said cap and knotted. When the cap 37 is in position upon the outer end of the tube 36 as shown in Fig. 2, the bulb end 40 of the thermometer will rest upon the eggs within the tray 18. In order that the thermometer 38 may adapt itself to any size egg, there is secured to the metallic plate 34 a staple 41 which receives a link 42 firmly secured to the tube 36. The said link has sufficient longitudinal and vertical movement within the staple 41 to permit the bulb of the thermometer to rest upon a large or small egg; said link and staple not only guiding the tube 36 during its pivotal movement, but also serving to hold the tube 36 in position within the opening 35 so that it cannot be disturbed by the newly hatched chicks. And further, since the thermometer 38 is securely fastened within the cap 37, there is no danger of its disturbance from the same cause. By reason of the above construction, the thermometer will also ride freely over the eggs, without danger of injury, when the egg tray is being inserted or withdrawn. It will now be seen that in order to ascertain the temperature of the eggs at any time, it is only necessary to remove the cap 37 from the tube 36, draw the thermometer through said tube and again insert it after a reading has been made. Therefore, the disastrous results which often follow the opening of the door of the incubator to ascertain the temperature of the eggs, are avoided in my construction.

The operation of my invention will be apparent from the foregoing description.

I do not wish to be limited to the details of construction and arrangement herein shown and described, and any alterations or modifications may be made therein to suit different conditions of use.

Having described my invention, I claim:

In an incubator, a casing therefor, a bottom for said casing provided with a plurality of apertures arranged in horizontal alinement, a nursery tray disposed immediately above said bottom, within the incubator, and a series of upwardly projecting ventilating tubes communicating with said apertures, provided within said nursery tray for conducting the air through said tray, an egg tray disposed above said nursery tray within the incubator, and a longitudinal member secured to the bottom of said egg tray, said member being positioned a short distance above and in alinement with said ventilating tubes, to diffuse the air which passes through said tubes, substantially as described.

In testimony whereof I have hereunto set my hand this 30th day of December, 1913.

ANDREW F. SHULER.

Witnesses:
HOWARD S. SMITH,
PHILO G. BURNHAM.

Copies of this patent may be obtained for five cents each, by addressing the "Commissioner of Patents, Washington, D. C."